United States Patent
Lee et al.

(10) Patent No.: US 10,399,555 B2
(45) Date of Patent: Sep. 3, 2019

(54) HYBRID VEHICLE AND METHOD OF CONTROLLING CHARGE MODE THEREFOR

(71) Applicants: Hyundai Motor Company, Seoul (KR); Kia Motors Corporation, Seoul (KR)

(72) Inventors: Jea Mun Lee, Seoul (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 15/848,972

(22) Filed: Dec. 20, 2017

(65) Prior Publication Data
US 2018/0281775 A1   Oct. 4, 2018

(30) Foreign Application Priority Data
Apr. 4, 2017   (KR) .................. 10-2017-0043532

(51) Int. Cl.
*B60W 10/08* (2006.01)
*B60W 20/14* (2016.01)
*B60W 10/06* (2006.01)

(52) U.S. Cl.
CPC .......... *B60W 20/14* (2016.01); *B60W 10/06* (2013.01); *B60W 10/08* (2013.01); *B60W 2520/10* (2013.01); *B60W 2540/10* (2013.01); *B60W 2540/12* (2013.01); *B60Y 2200/92* (2013.01); *Y02T 10/6286* (2013.01); *Y10S 903/903* (2013.01)

(58) Field of Classification Search
CPC ...... B60W 20/14; B60W 10/06; B60W 10/08; B60W 2520/10; B60W 2540/10; B60W 2540/12; B60Y 2200/92; Y02T 10/6286; Y10S 903/903
USPC ......................................................... 701/22
See application file for complete search history.

(56) References Cited

U.S. PATENT DOCUMENTS

2009/0143950 A1*   6/2009   Hasegawa ............... B60K 6/48
                                                            701/68
2011/0010063 A1*   1/2011   Ota ....................... B60K 6/365
                                                            701/58

FOREIGN PATENT DOCUMENTS

| JP | H06330790 A | 11/1994 |
| JP | 2007-099022 A | 4/2007 |
| JP | 2008-168733 A | 7/2008 |
| JP | 2010-183785 A | 8/2010 |
| JP | 2014227866 A | 12/2014 |
| KR | 101371476 B1 | 3/2014 |

(Continued)

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A hybrid vehicle and a method of controlling a charge mode therefor are provided. The control method includes determining a first torque, which is a currently requested torque and determining a second torque, which is a predicted requested torque that is predicted to be generated in the near future from the present time, or predicted acceleration. Additionally, the method includes releasing a lock-up charge mode when the first torque is less than a first threshold value relevant to a reference for determining coasting driving and the second torque or the predicted acceleration is less than a second threshold value relevant to a driving mode change reference.

20 Claims, 8 Drawing Sheets

(56) References Cited

FOREIGN PATENT DOCUMENTS

| KR | 10-1542988 | B1 | 8/2015 |
| KR | 10-1588793 | B1 | 1/2016 |
| KR | 10-1588794 | B1 | 1/2016 |
| KR | 10-2016-0070980 | A | 6/2016 |

* cited by examiner

HYBRID VEHICLE AND METHOD OF CONTROLLING CHARGE MODE THEREFOR

CROSS REFERENCE TO RELATED APPLICATION(S)

This application claims the benefit of Korean Patent Application No. 10-2017-0043532, filed on Apr. 4, 2017 which is hereby incorporated by reference as if fully set forth herein.

BACKGROUND

Field of the Invention

The present invention relates to a hybrid vehicle and a method of controlling a charge mode therefor, and more particularly, to a charge mode control method, which is capable of maintaining or releasing a specific charge mode by predicting a driver requested torque or braking intention, and a hybrid vehicle for performing the same.

Discussion of the Related Art

Recently, with the continued demand for improvement of fuel efficiency of vehicles and regulations regarding emissions from vehicles, the demand for environmentally friendly vehicles has increased. As a practical representative thereof, hybrid electric vehicles (HEVs) and plug-in hybrid electric vehicles (PHEVs) have been developed.

A hybrid vehicle operates using two power sources including an engine and a motor. In the case of harmonious operation of the engine and the motor, optimal output and torque may be generated. Specifically, for a hybrid vehicle equipped with a parallel-type or TMED-type (Transmission-Mounted-Electric-Device-type) hybrid system, in which an electric motor and an engine clutch (EC) are installed between an engine and a transmission, the output of the engine and the output of the motor may be transmitted to a driving shaft simultaneously.

Typically, in the initial stage of accelerating, a hybrid vehicle operates using electrical energy (i.e. an EV mode). However, there is a limitation in providing the power requested by a driver using only electrical energy, and there is thus a need to use an engine as a main power source (i.e. an HEV mode) at certain moments. Accordingly, when the difference between the number of revolutions per minute of the motor and the number of revolutions per minute of the engine is within a predetermined range, the hybrid vehicle operates such that an engine clutch is engaged and thus, the motor and the engine rotate together. The structure of the hybrid vehicle will be described below with reference to FIG. 1.

FIG. 1 illustrates an exemplary structure of a powertrain of a general hybrid vehicle according to the related art. Referring to FIG. 1, the powertrain of the hybrid vehicle adopts a parallel-type hybrid system, in which an electric motor (or a drive motor) 40 and an engine clutch 30 are mounted between an internal combustion engine (ICE) 10 and a transmission 50.

Typically, when a driver engages an accelerator after starting the vehicle (i.e., the accelerator pedal position sensor on mode), the motor 40 is first driven using the electric power of a battery when the engine clutch 30 is opened, and wheels are moved by the power transferred to a final drive (FD) 60 via the transmission 50 from the motor (i.e., an EV mode). When a greater driving force is required due to the gradual acceleration of the vehicle, the engine 10 may be driven by operating an auxiliary motor (or a starter/generator motor) 20.

Thus, when the number of revolutions per minute (RPM) of the engine 10 and the number of revolutions per minute of the motor 40 are equal to each other, the engine clutch 30 is engaged and thus, the vehicle is driven by both the engine 10 and the motor 40 (i.e., transition from the EV mode to an HEV mode). When a predetermined engine off condition, such as the deceleration of the vehicle, is satisfied, the engine clutch 30 is opened and the engine 10 is stopped (i.e., transition from the HEV mode to the EV mode). In particular, the battery 70 is charged through the motor 40 using the driving force of the wheels in the vehicle, which is referred to as braking energy regeneration or regenerative braking. Accordingly, the starter/generator motor 20 operates as a starter motor when the engine is started, and also operates as a generator when the rotational energy of the engine is recovered after starting or during starting off. Therefore, the starter/generator motor 20 may be referred to as a hybrid starter generator (HSG).

In the hybrid vehicle, unlike the general charge mode using the regenerative braking or the HSG 20, the battery 70 may also be charged through electricity generation by the electric motor 40 using both the driving force of the engine 10 and the coasting energy of the vehicle (i.e., the accelerator pedal position sensor off mode) when the engine clutch 30 is locked up, that is, when the wheels and the engine 10 are connected to each other. This charge mode, which is performed in the state in which the engine clutch 30 is locked up, may be referred to as a lock-up charge mode, and the movement of energy in the lock-up charge mode is as indicated by the arrows in FIG. 1.

The process of performing the lock-up charge mode will be described below with reference to FIG. 2. FIG. 2 is a graph illustrating an exemplary process of performing the lock-up charge mode in a general hybrid vehicle according to the related art.

Referring to FIG. 2, as the value of the accelerator pedal position sensor (APS) initially increases in the EV mode, the speed of the vehicle increases, and when the speed of the vehicle exceeds a predetermined level, the driving mode is switched to the HEV mode and the engine is started. Subsequently, as the value of the APS decreases, the vehicle coasts, and the lock-up charge mode is activated. While the lock-up charge mode is in an activated state, the engine is maintained in the on state without stalling, and the power of the engine is used for electricity generation through the electric motor.

The lock-up charge mode generally has greater charging efficiency than recovery of the power of the engine using the starter/generator motor 12. Further, the lock-up charge mode also uses the coasting energy of the vehicle, and thus, the lock-up charge mode generates a charge having a greater magnitude. In addition to these advantages, when the operation amount of the accelerator pedal of a driver is substantial, when the driver releases or disengages the accelerator pedal (Tip-Out), the lock-up charge mode is activated and is maintained for a predetermined time period regardless of the state of charge (SOC) of the battery 70, and the engine on state is maintained until subsequent manipulation or engagement of the accelerator pedal (Tip-In) is performed, thereby preventing the engine from being unnecessarily and repeatedly turned on and off.

For example, when the lock-up charge mode is not activated, when a requested torque decreases due to the APS OFF in FIG. 2, the engine may immediately be turned off and the driving mode may be switched to the EV mode. In this state, when the APS is turned on again, the engine is required to be turned on again and the driving mode is switched to the HEV mode. However, when the lock-up charge mode is activated, the engine on state is maintained while the lock-up charge mode is performed. Therefore, it is not necessary to repeatedly turn the engine on and off even when the APS is turned on again during the lock-up charge mode.

However, in the lock-up charge mode, the coasting energy of the vehicle as well as the power of the engine is converted into the charging energy, which conveys a braking sensation to the driver. Further, in general, the hybrid vehicle autonomously enters the lock-up charge mode without a driver's request, and thus, when the driver manipulates the brake pedal during the lock-up charge mode, the driver may feel an abnormal braking sensation and consequently drivability may be deteriorated. Accordingly, in a general hybrid vehicle, when a driver engages the brake pedal, the lock-up charge mode is released. Problems with this conventional lock-up charge mode will be described below with reference to FIGS. 3 and 4.

FIGS. 3 and 4 are views illustrating problems with a general lock-up charge mode according to the related art. In FIG. 3, the horizontal axis indicates the time, and the vertical axis indicates the value of a brake pedal sensor (BPS). In addition, two reference lines indicating predetermined values of the BPS are drawn along the horizontal axis. One of the two reference lines, which is located at an upper position, indicates the value of the BPS at which a driver feels an abnormal braking sensation when the braking operation is performed during the lock-up charge mode, and the other reference line, which is located at a lower position, indicates a fixed value of the BPS, at which the predetermined lock-up charge mode is released.

In a general hybrid vehicle, when a driver manipulates or engages the brake pedal, the lock-up charge mode is released. However, as indicated by the graph (1), when a sudden braking operation is performed after a gentle braking operation, the lock-up charge mode is released based on the release reference value of the lock-up charge mode before the value of the BPS reaches the reference value at which the driver feels an abnormal braking sensation, and accordingly, the driver does not feel an abnormal braking sensation. On the other hand, as indicated by the graph (2), even when a relatively gentle braking operation is performed, when the value of the BPS exceeds the release reference value of the lock-up charge mode, the lock-up charge mode is immediately released. In other words, in some cases, the lock-up charge mode may be released unnecessarily. In a conventional hybrid vehicle, it is not possible to determine whether a driver performs the braking operation indicated by the graph (1) or performs the braking operation indicated by the graph (2), and thus, the release reference value of the lock-up charge mode is set to be relatively low to prepare for the braking operation indicated by the graph (1).

In addition, even when the accelerator pedal is intermittently released, the lock-up charge mode may be controlled inefficiently, which will be described below with reference to FIG. 4. In FIG. 4, the horizontal axis denotes the time, and the vertical axis denotes the value of an accelerator pedal position sensor (APS). As indicated by the graph (1), when the APS is maintained in the off state for a substantial period of time after the tip-out, when the lock-up charge mode is necessarily maintained for a predetermined time period, the engine on state is unnecessarily maintained, which may have a negative influence on fuel efficiency. On the other hand, as indicated by the graph (2), when the tip-out is temporarily performed, it is effective to maintain the lock-up charge mode. Therefore, there is a problem in that the lock-up charge mode may have a negative influence on fuel efficiency based on a driver's intention to accelerate or decelerate the vehicle.

SUMMARY

Accordingly, the present invention provides a hybrid vehicle and a method of controlling a charge mode therefor that substantially obviate one or more problems due to limitations and disadvantages of the related art. An object of the present invention is to provide a method of controlling a charge mode more efficiently in a hybrid vehicle and a vehicle for performing the same. More particularly, an object of the present invention is to provide a charge mode control method, which is capable of improving the operation of maintaining or releasing a lock-up charge mode in a parallel-type hybrid vehicle, and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a charge mode for a hybrid vehicle may include determining a first torque, the first torque being a currently requested torque, determining a second torque or predicted acceleration, the second torque being a predicted requested torque that is predicted to be generated in a near future from a present time, and releasing a lock-up charge mode when the first torque is less than a first threshold value relevant to a reference for determining coasting driving and the second torque or the predicted acceleration is less than a second threshold value relevant to a driving mode change reference.

In another aspect of the present invention, a hybrid vehicle may include a driving information detection unit configured to detect driving information related to traveling of the hybrid vehicle using sensors of the hybrid vehicle, a driver acceleration/deceleration prediction unit configured to generate a driver near-future acceleration/deceleration intention predictive value, to which traveling conditions of the hybrid vehicle are reflected, using information transmitted from the driving information detection unit utilizing an acceleration/deceleration prediction model, and a hybrid controller configured to determine a first torque using information transmitted from the driving information detection unit, the first torque being a currently requested torque, and determine a second torque or predicted acceleration using the near-future acceleration/deceleration intention predictive value, the second torque being a predicted requested torque that is predicted to be generated in a near future from a present time. The hybrid controller may further be configured to release a lock-up charge mode when the first torque is less than a first threshold value relevant to a reference for determining coasting driving and the second torque or the predicted acceleration is less than a second threshold value relevant to a driving mode change reference.

In a further aspect of the present invention, a hybrid vehicle may include a driving information detection unit configured to detect driving information related to traveling of the hybrid vehicle in association with sensors of the hybrid vehicle, a driver acceleration/deceleration prediction unit configured to generate a driver near-future acceleration/deceleration intention predictive value, to which traveling conditions of the hybrid vehicle are reflected, using information transmitted from the driving information detection unit utilizing an acceleration/deceleration prediction model, and a hybrid controller configured to determine a third torque using information transmitted from the driving information detection unit, the third torque being a current braking torque, and determine a fourth torque or predicted acceleration using the near-future acceleration/deceleration intention predictive value, the fourth torque being a predicted braking torque predicted to be generated in a near future from a present time. When a lock-up charge mode is activated, the hybrid controller may be configured to release the lock-up charge mode when the third torque is greater than a third threshold value relevant to a reference for releasing the lock-up charge mode and the fourth torque or the predicted acceleration is greater than a fourth threshold value relevant to a reference for ensuring drivability.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
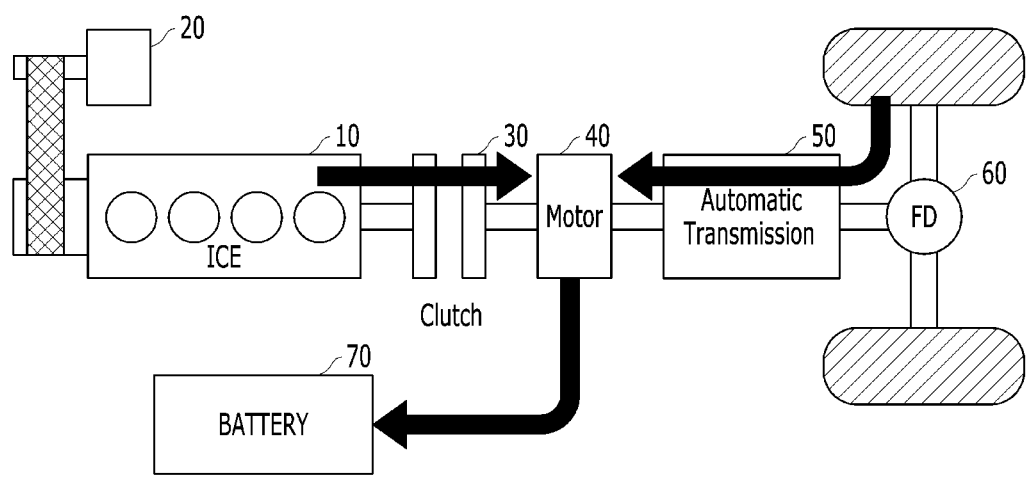
FIG. 1 illustrates an exemplary structure of a powertrain of a general hybrid vehicle according to the related art.
Figure 2:
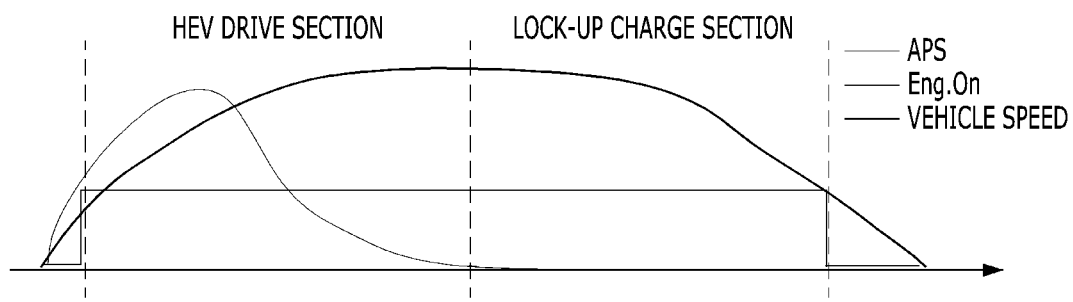
FIG. 2 is a graph illustrating an exemplary process of performing a lock-up charge mode in a general hybrid vehicle according to the related art.
Figure 3:
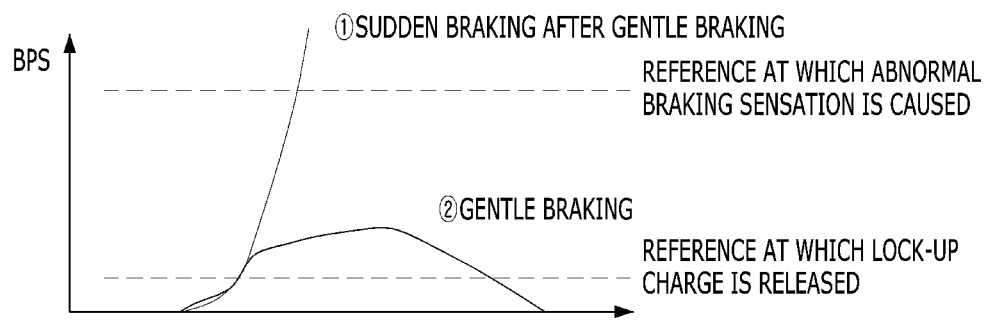
FIGS. 3 and 4 are views illustrating problems with a general lock-up charge mode according to the related art.
Figure 4:
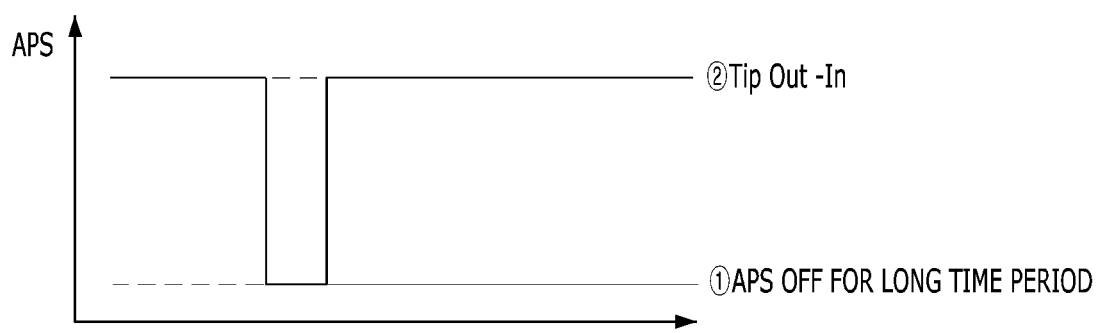

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. However, it will be understood that the present invention should not be limited to the embodiments and may be modified in various ways. In the drawings, to clearly and briefly explain the present invention, illustration of elements having no connection with the description is omitted, and the same or extremely similar elements are designated by the same reference numerals throughout the specification. Wherever possible, the same reference numbers will be used throughout the drawings to refer to the same or like parts.

Figure 5:
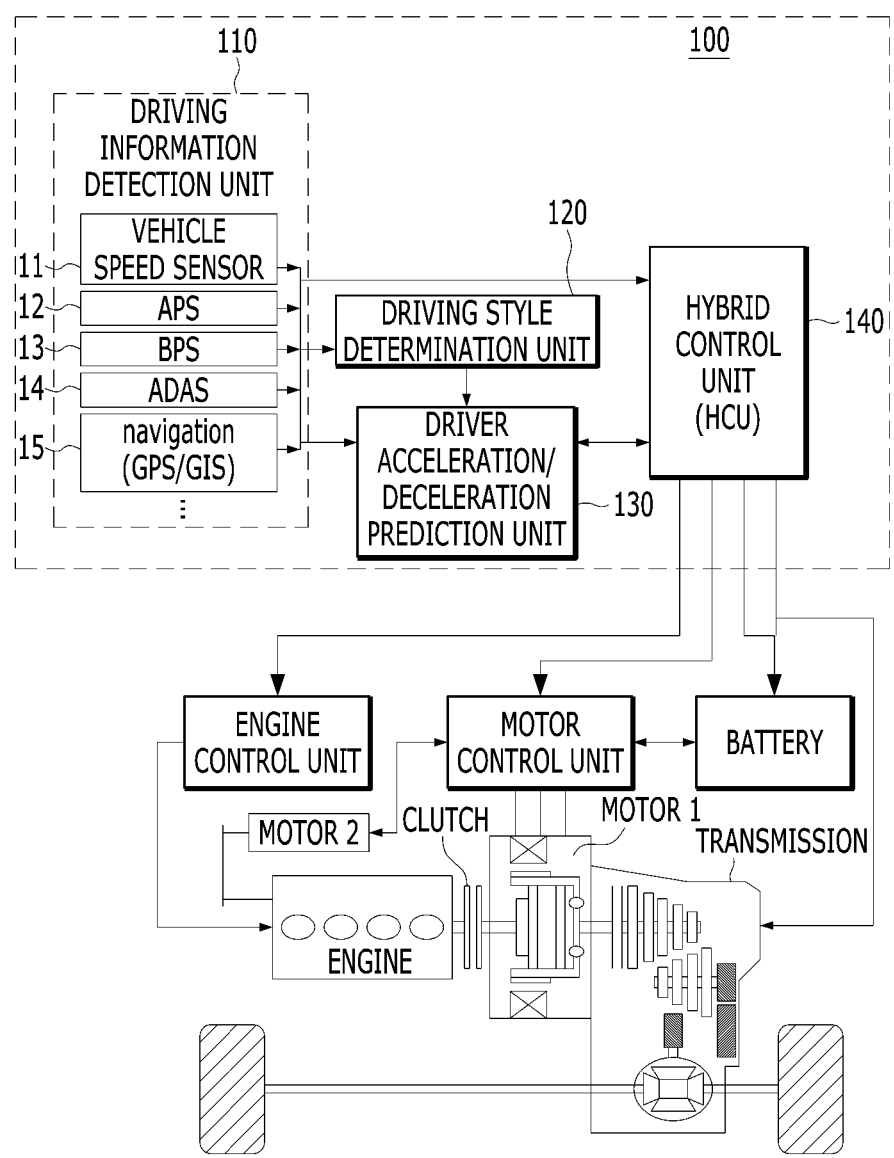
FIG. 5 is a block diagram schematically illustrating a control system of a hybrid vehicle according to an exemplary embodiment of the present invention.

The structure of a hybrid vehicle, to which exemplary embodiments of the present invention are applied, will be described below with reference to FIG. 5. FIG. 5 is a block diagram schematically illustrating a control system of a hybrid vehicle according to an exemplary embodiment of the present invention.

Referring to FIG. 5, a control system 100 of the hybrid vehicle according to the exemplary embodiment of the present invention may include a driving information detection unit 110, a driving tendency determination unit 120, a driver acceleration/deceleration prediction unit 130, and a hybrid controller 140. This construction is merely illustrative, and a greater or smaller number of components may constitute the gear-shift control system (e.g. the driving tendency determination unit may be omitted). The controller may be configured to operate the other various units of the vehicle.

The driving information detection unit 110 may be configured to detect driving information related to the traveling of the vehicle, in association with at least one of a vehicle speed sensor 111, an accelerator pedal position sensor (APS) 112, a brake pedal sensor (BPS) 113, an advanced driver assistance system (ADAS) 114, or a navigation device 115. The driving information detection unit 110 may specifically be configured to detect the state of operation of the accelerator by the driver through the APS 112, and detect the state of operation of the brake by the driver through the BPS 113. In other words, the driving information detection unit 110 may include a plurality of sensors.

In particular, the driving information detection unit 110 may be configured to detect the vehicle speed using the vehicle speed sensor 111, and detect information regarding movement ahead of the vehicle, which includes the relative distance to the foregoing vehicle and the state of acceleration, through radar sensors or (stereo) cameras of the ADAS 114. Besides the radar sensors or cameras, various other sensors using, for example, ultrasonic waves or lasers, may be employed in accordance with the configuration of the ADAS. The driving information detection unit 110 may be configured to detect navigation information (road environment information) such as, for example, a vehicle location based on global position system (e.g., GPS/GIS), a type of road, a traffic congestion degree, a speed limit, an intersection, a tollgate, a turn, and a slope, through the navigation device 115. Particularly, the navigation device 115 may refer to the navigation map stored therein and traffic information collected through external wireless communication (e.g. telematics or TPEG) to provide the above information.

The driving tendency determination unit 120 may be configured to determine a driver's driving tendency based on driving patterns such as, for example, an average vehicle speed, variation in the accelerator pedal position sensor (APS) dAPS, and variation in the brake pedal sensor (BPS) dBPS, which are caused by a driver's driving operation (e.g., the rapidness or frequency of engaging either pedal). For example, the driving tendency determination unit 120 may include a fuzzy membership function using the factors detected by the driving information detection unit 110, which include the variation in the APS, the variation in the BPS, the vehicle speed and the degree of slope, as input parameters, and may be configured to calculate a short-term driving tendency index (SI=0 to 100%).

The driving tendency determination unit 120 may further be configured to divide the calculated short-term driving tendency index (SI=0 to 100%) by a predetermined reference percentage based on the degree of driving tendency, thereby enabling the driver's driving tendency to be determined to be one of a plurality of levels. The driver acceleration/deceleration prediction unit 130 may be configured to learn an acceleration/deceleration prediction model based on the driving tendency utilizing a machine-learning method, and generate a predictive value of a driver's intention of accelerating and decelerating in the near future, which reflects the traveling conditions of the vehicle and the driving tendency, using the acceleration/deceleration prediction model.

In other words, the driver acceleration/deceleration prediction unit 130 may be configured to use the vehicle speed, the radar information and the navigation information, detected by the driving information detection unit 110, and the driver's driving tendency as input parameters, and quantitatively digitize the driving operation performed in a comparatively short time unit, thereby determining the driver's momentary intention of accelerating/decelerating and consequently generating a predictive value of acceleration/deceleration by the driver in the near future. This acceleration/deceleration predictive value may include a force and a probability of engaging the accelerator pedal or the brake pedal, broken down into predetermined units of time, in the near future (e.g., within a predetermined period of time).

The prediction algorithm of the acceleration/deceleration prediction unit 130 may include a neural network that compensates for the pre-generated prediction model utilizing the machine-learning method, which will be described in detail later. Further, the hybrid controller 140 may be configured to operate the components for switching the driving mode of the hybrid vehicle according to the exemplary embodiment of the present invention, and operate as a top-level controller that integrally operates an engine controller and a motor controller, which are connected thereto over a network.

In particular, the hybrid controller 140 may be configured to analyze the currently requested torque of the driver based on variation in the APS or BPS detected by the driving information detection unit 110, and may be configured to transmit the currently requested torque or a command that corresponds thereto to another controller. In addition, the hybrid controller 140 may be configured to receive the near-future acceleration/deceleration predictive value, predict a requested torque or the degree of acceleration at a specific point of time in the near future, and perform a control operation based thereon, for example, determine whether to maintain or release a lock-up charge mode.

For example, the transmission controller may be configured to receive information regarding the currently requested torque and the near-future requested torque predictive value from the hybrid controller 140, may be configured to determine whether to perform a gear shift, and transmit a gear-shift command, that corresponds to the determination result, to the transmission. Depending on the exemplary embodiment, when the acceleration/deceleration prediction unit 130 also predicts a near-future requested torque using the near-future acceleration/deceleration predictive value, the acceleration/deceleration prediction unit 130 may be configured to perform a relevant control operation using the near-future requested torque predictive value, or transmit the predictive value to another controller.

The above-described exemplary embodiment may alternatively be configured such that the driving tendency determination unit 120 is omitted. In particular, the driver acceleration/deceleration prediction unit 130 may be configured to perform acceleration/deceleration prediction without input values related to the driving tendency.

Figure 6A:
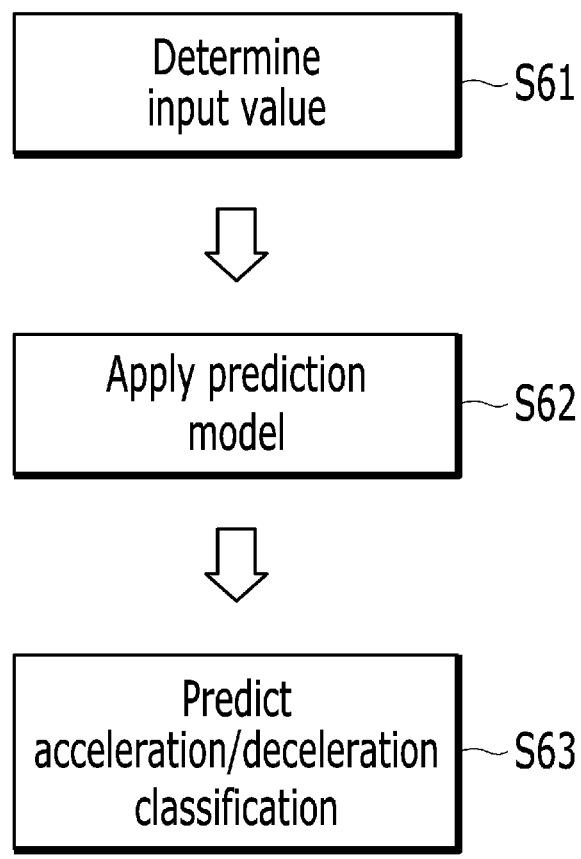
FIGS. 6A and 6B illustrate an exemplary process of predicting a driver's intention of accelerating/decelerating that is applicable to the exemplary embodiments of the present invention.
Figure 6B:
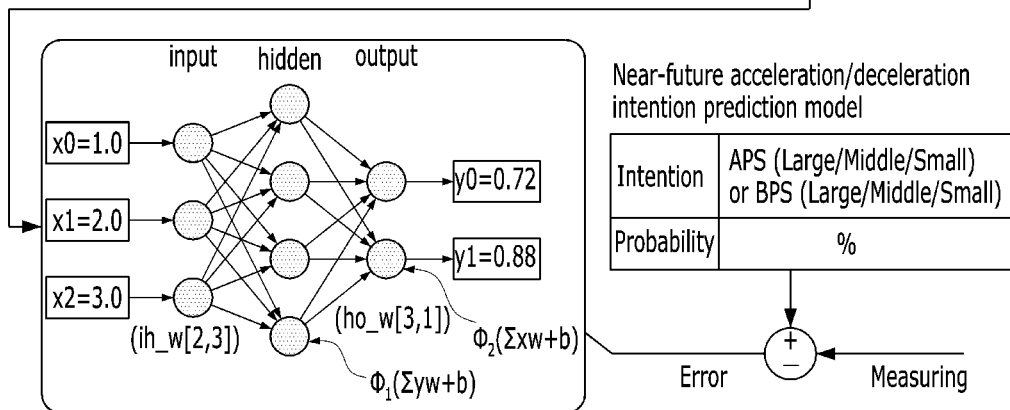

Hereinafter, a method of predicting the driver's intention of accelerating/decelerating using the driver acceleration/deceleration prediction unit 130 will be described with reference to FIGS. 6A and 6B. FIGS. 6A and 6B illustrate an exemplary process of predicting the driver's intention of accelerating/decelerating that is applicable to the exemplary embodiments of the present invention.

Referring to FIG. 6A, the process of predicting the driver's intention of accelerating/decelerating, which is performed by the driver acceleration/deceleration prediction unit 130, may include the following three steps. The method described herein below may be executed by the controller described above having a processor and a memory. First, the controller may be configured to determine what parameters are used as input values for prediction (S61). The determined input values modify a prediction model through machine learning (S62). Acceleration or deceleration is determined through the input values and the modified model, and a predictive value pertaining to the near-future situation is calculated (S63).

Step S61 of determining the input values may include: extracting candidate values of the input values; preprocessing data by integrating the input signals; and selecting final parameters using the preprocessed candidate values. A time-series-model-based method or a deep-learning-based method may be used as the machine-learning method. Examples of the time-series-model-based method include an autoregressive integrated moving average (ARIMA) method, which represents variation in action over time using stochastic indicators, and a multi-layer perceptron (MLP) method, which uses a nonparametric regression method for a universal approximator.

Examples of the deep-learning-based method include a stacked autoencoder (SAE) method, which makes input and output data similar to each other through dimension reduction, a recurrent-neural-networks (RNNs) method, which is a neural network algorithm for processing sequential information, and a long-short-term memory (LSTM) method, which is suitable for long-term dependent learning. An exemplary process of predicting the driver's intention of accelerating/decelerating in the near future, which is performed by the driver accelerating/decelerating prediction unit using a neural network algorithm, among the above machine-learning methods, is illustrated in FIG. 6B. Referring to FIG. 6B, the driver acceleration/deceleration prediction unit 130 according to the exemplary embodiment of the present invention may include a neural network, which learns an acceleration/deceleration prediction model based on a driver's driving tendencies utilizing the machine-learning method.

A near-future acceleration/deceleration prediction model for driving tendencies may be prestored in the driver acceleration/deceleration prediction unit 130 based on big data accumulated through test driving utilizing the neural network before the vehicle is released for sale. Further, the driver acceleration/deceleration prediction unit 130 may be configured to add vehicle movement data, learned from an actual driver's driving operation after the vehicle is sold to the driver, to the near-future acceleration/deceleration prediction model for driving tendencies, which has been prestored therein utilizing the neural network, and may therefore generate a near-future acceleration/deceleration prediction model for driving tendencies specialized for the actual driver. In particular, in accordance with the determination of the actual driver's tendencies, the driver acceleration/deceleration prediction unit 130 may be configured to apply the learned movement data to the near-future acceleration/deceleration prediction model that corresponds to the determined driving tendency.

Further, the driver acceleration/deceleration prediction unit 130 may be configured to calculate a near-future acceleration/deceleration intention predictive value depending on the driver's driving tendency based on input information including a driving environment and the driver's driving tendencies, which are determined based on the vehicle speed, radar information and navigation information. In particular, the driving tendency, as shown in FIG. 6B, may be classified into a plurality of types, and may be represented by numerical values of an average vehicle speed, variation in use of the accelerator pedal dAPS, and variation in use of the brake pedal dBPS.

The driver acceleration/deceleration prediction unit 130 may be configured to modify the driver acceleration/deceleration model in real time through the machine-learning method when installed in the vehicle, or may be used only for prediction, but not for learning, by receiving a modified model from an external device. In other words, when the model is modified by an external device, the parameters, which are input values for learning, may be transmitted to a telematics center or to a cloud server. Therefore, the modification of the model through learning may be performed by the external device, and only the final model may then be transmitted to the vehicle.

Figure 7:
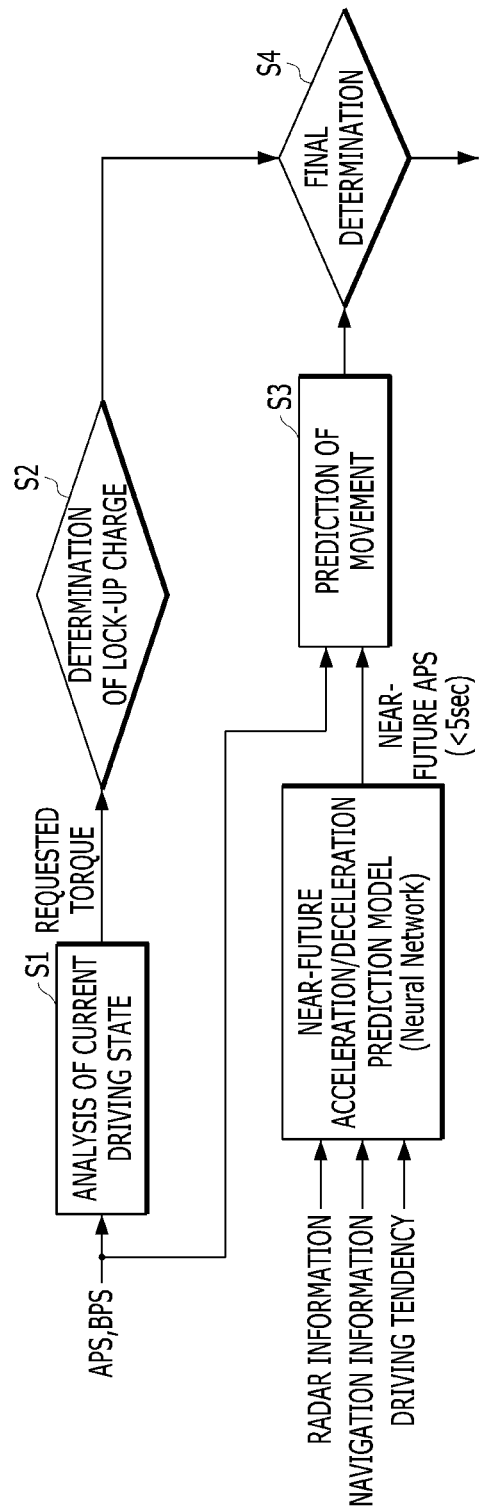
FIG. 7 illustrates a method of determining a charge mode utilizing a near-future acceleration/deceleration prediction model according to an exemplary embodiment of the present invention.

FIG. 7 illustrates a method of determining a charge mode utilizing the near-future acceleration/deceleration prediction model according to an exemplary embodiment of the present invention. Referring to FIG. 7, the hybrid controller 140 according to the exemplary embodiment of the present invention may be configured to analyze the current driving state based on variation in the APS or BPS based on the driver's manipulation or engagement/disengagement, and calculate a requested torque (S1). The hybrid controller 140 may further be configured to determine whether to enter the lock-up charge mode based on the currently requested torque (S2).

The driver acceleration/deceleration prediction unit 130 may be configured to output prediction information regarding a driver's intention of accelerating/decelerating utilizing the near-future acceleration/deceleration prediction model, and the hybrid controller 140 may be configured to predict the movement of the vehicle that will occur in the near future based on the prediction information (S3). The hybrid controller 140 may further be configured to combine the determination result in step S2 and the determination result in step S3, and finally determine whether to maintain or release the lock-up charge mode (S4).

The requested torque predictive value may be calculated by the driver acceleration/deceleration prediction unit 130, or, as described above, may be calculated by the hybrid controller 140. Although not illustrated in the drawings, the requested torque predictive value may be calculated by a separate controller configured to generate the requested torque predictive value. Hereinafter, a method of changing the driving mode of the hybrid vehicle according to the exemplary embodiment of the present invention, which is performed by the above-described control system 100 of the hybrid vehicle as a main agent, will be described in more detail with reference to FIG. 8.

Figure 8:
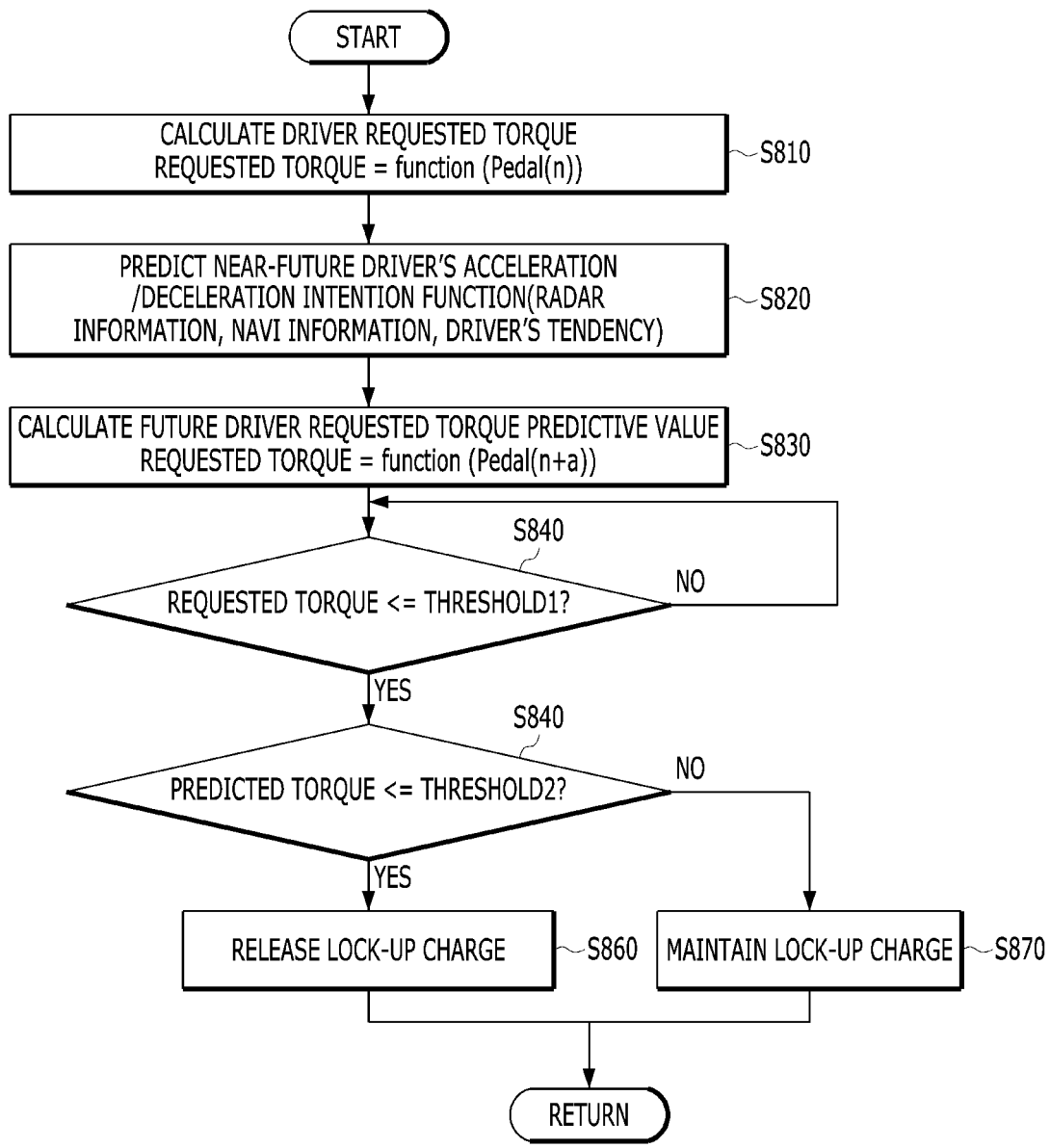
FIG. 8 is a flowchart showing an exemplary method of controlling a mode change in the hybrid vehicle according to the exemplary embodiment of the present invention.

FIG. 8 is a flowchart showing an exemplary method of controlling a mode change in the hybrid vehicle according to the exemplary embodiment of the present invention, based on the assumption that the current mode of the vehicle is a lock-up charge mode. Referring to FIG. 8, the hybrid controller 140 may be configured to detect variation in the APS or variation in the BPS through the driving information detection unit 110 and calculate a driver's currently requested torque (S810).

The request torque may be derived from a function for pedal position values Pedal(n), which are currently detected by the pedal sensors (e.g., the APS and the BPS). When the accelerator pedal is manipulated (i.e. variation in the APS occurs and the pedal is engaged by a driver/pressure is exerted onto the pedal), the value '(n)' may have a positive (+) value, and when the brake pedal is manipulated (i.e. variation in the BPS occurs and the pedal is engaged by a driver/pressure is exerted onto the pedal), the value '(n)' may have a negative (−) value. When the hybrid controller 140 detects both variation in the APS and variation in the BPS attributable to erroneous manipulation by the driver, the hybrid control 140 may be configured to calculate the requested torque based only on the variation in the BPS, excluding the variation in the APS, by applying a brake override function. The driver acceleration/deceleration prediction unit 130 may be configured to generate a near-future driver acceleration/deceleration intention predictive value Pedal(n+a) through a function (i.e. function(Radar information, Navi information, Driver's tendency)), the input values of which include a vehicle speed, radar information, navigation information, and the driver's driving tendencies (S820).

Pedal(n+a) represents the position of the accelerator pedal or the brake pedal after 'a' seconds. The value of 'a' may be about 5 seconds or less; however, the exemplary embodiment is not limited thereto. The near-future acceleration/deceleration intention predictive value may include a driver's acceleration intention (e.g., an increase in the value of the APS or a decrease in the value of the BPS) or deceleration intention (e.g., a decrease in the value of the APS or an increase in the value of the BPS), variation in the APS or the BPS, and the position of the accelerator pedal or the brake pedal, which are predicted to occur in the near future, i.e. after a predetermined time period. In addition to information regarding the acceleration/deceleration intention, the variation, and the position of the pedal, probability information associated therewith may also be included.

The hybrid controller 140 may be configured to determine a near-future requested torque predictive value, i.e. a "predicted torque", using the acceleration/deceleration intention predictive value Pedal(n+a) from the driver acceleration/deceleration prediction unit 130 (S830). The hybrid controller 140 may be configured to determine whether to enter or maintain the lock-up charge mode using the requested torque and the predicted torque.

Described in detail, when the currently requested torque is less than a predetermined value Threshold1 (S840) and the near-future predicted torque is less than a predetermined value Threshold2 (S850), the hybrid controller 140 may determine release of the lock-up charge mode (S860). When the near-future predicted torque is greater than the predetermined value Threshold2 (S850), the hybrid controller 140 may maintain the lock-up charge mode (S870).

The value Threshold1 may be a torque that corresponds to the APS off mode, which may be set differently for respective vehicles. The situation corresponding to the APS off mode refers to the situation in which the vehicle is coasting, which is a condition under which the vehicle enters the lock-up charge mode. The value Threshold2 may be a torque that corresponds to a condition under which the driving mode is switched from the EV mode to the HEV mode.

In conclusion, in response to determining at step S840 that the condition for entering the lock-up charge mode is satisfied and determining at step S850 that torque will be generated in the near future so that the vehicle is driven in the HEV mode, the lock-up charge mode may be maintained to prevent the engine from being unnecessarily turned off (S870). In response to determining that the vehicle will be driven in the EV mode in the near future, the lock-up charge mode may be released to prevent the lock-up charge mode from being unnecessarily maintained (S860).

Figure 9:
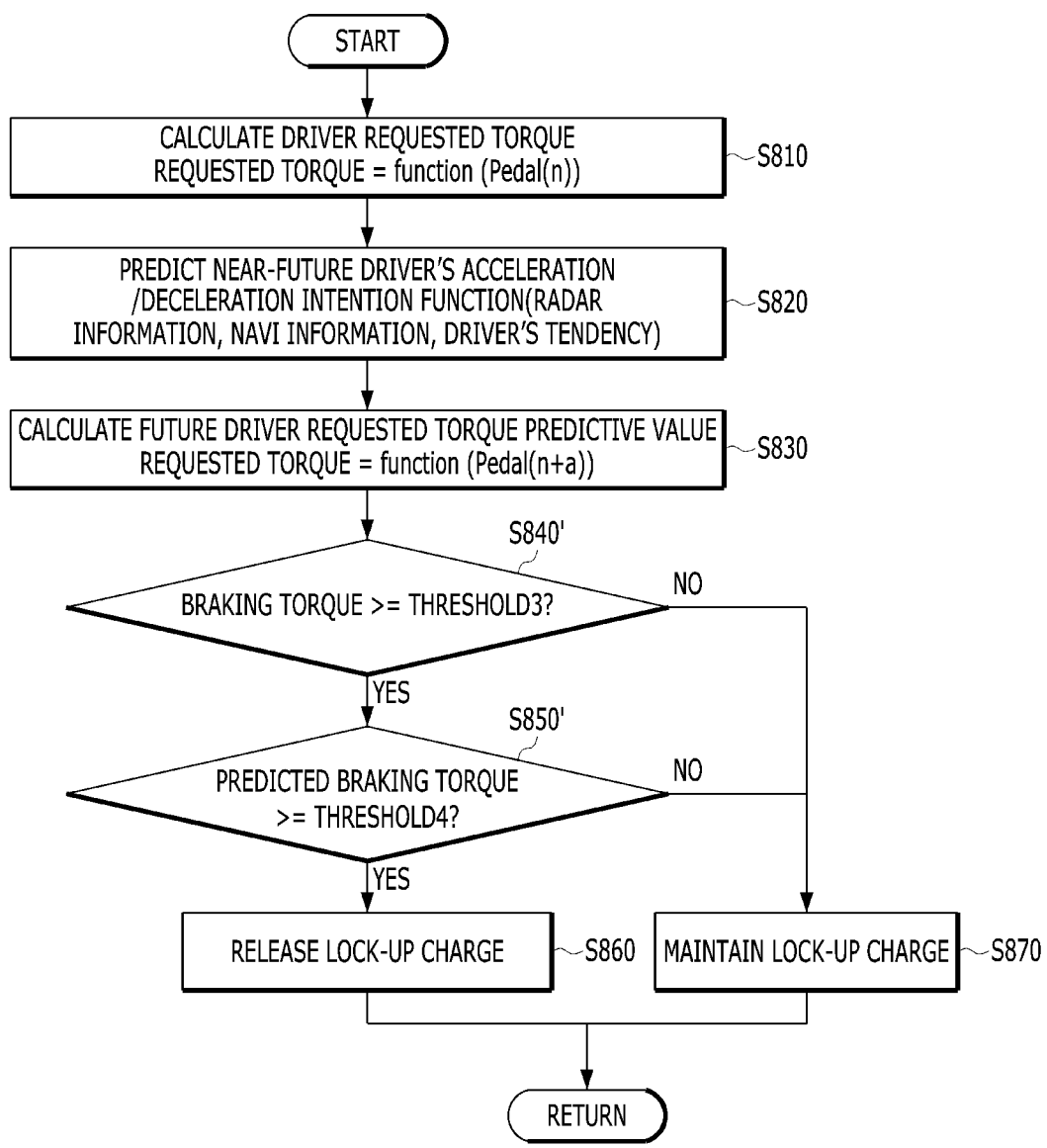
FIG. 9 is a flowchart showing another exemplary method of controlling a mode change in the hybrid vehicle according to the exemplary embodiment of the present invention.

The above-described control process may alternatively be performed using a braking torque, i.e. based on manipulation of the brake pedal, which will be described below with reference to FIG. 9. FIG. 9 is a flowchart showing another exemplary method of controlling a mode change in the hybrid vehicle according to the exemplary embodiment of the present invention.

Only differences from the exemplary embodiment in FIG. 8 will be described. A description of the exemplary embodiment in FIG. 9 will be based on the assumption that the current mode of the vehicle is a lock-up charge mode. The hybrid controller 140 may be configured to determine whether to release or maintain the lock-up charge mode using a braking torque and a predicted braking torque and then operate the vehicle accordingly. The braking torque is a value of the BPS, which may be calculated by the hybrid controller. The predicted braking torque may refer to the situation in which the predicted torque has a negative value (i.e. the situation in which the acceleration/deceleration prediction result is calculated based on the value of the BPS).

In particular, when the current braking torque is greater than a predetermined value Threshold3 (S840') and the near-future predicted braking torque is greater than a predetermined value Threshold4 (S850'), the hybrid controller 140 may be configured to determine to release the lock-up charge mode (S860). When the current braking torque is less than the predetermined value Threshold3 (S840') or when the near-future predicted braking torque is less than the predetermined value Threshold4 (S850'), the hybrid controller 140 may be configured to maintain the lock-up charge mode (S870).

The value Threshold3 may be a braking torque that corresponds to a predetermined lock-up charge mode release reference, which may be set differently for respective vehicles. In other words, the value Threshold3 in step S840' may refer to a reference, based on which the lock-up charge mode is released in advance to prevent the braking torque from affecting drivability. The value Threshold4 may be a braking torque, at which a driver may actually feel an abnormal braking sensation when the braking operation is performed during the lock-up charge mode.

In conclusion, in response to determining at step S840' that the braking torque is greater than the reference for preventing the braking torque from affecting drivability and determining at step S850' that a substantially large braking torque will be generated in the near future, the lock-up charge mode may be released to maintain drivability (i.e. to prevent a driver from feeling an abnormal braking sensation) (S860). Additionally, in response to determining at step S840' that the current braking torque is generated within the predetermined lock-up charge mode release reference or determining at step S850' that a braking torque will not be generated to an extent that causes a driver to actually feel an abnormal braking sensation, the lock-up charge mode may be maintained (S870).

The above exemplary embodiments have been described as being configured such that a driver acceleration/deceleration intention prediction model is constructed and modified using a machine-learning method, through which a driver's intention in the future based on the current traveling conditions is learned based on data accumulated by a vehicle during the actual operation of the vehicle. However, the configuration may alternatively be generated such that a near-future acceleration/deceleration intention predictive value is determined using a predetermined rule, instead of using the aforementioned prediction model. One example of such a rule is shown in the following Table 1.

TABLE 1

| Input signal | Analysis of driving situation | Expected result |
|---|---|---|
| [Navi/Telematics]<br>Road type = Highway<br>Congestion information = Smooth<br>Front event = none<br>[Radar]<br>Front vehicle distance = Close<br>Front vehicle relative velocity = −10 kph<br>[Driving style/history]<br>Constant speed driving for the past 5 minutes<br>[Lane departure prevention system]<br>Maintain the current lane | Constant speed driving<br>Intermittent braking for maintaining the distance from the preceding vehicle | APS = 0, BPS = Small |
| [Navi/Telematics]<br>Road type = Highway<br>Congestion information = Smooth<br>Front event = Tollgate/200 m<br>[Radar]<br>Front vehicle distance = none<br>Front vehicle relative speed = N/A<br>[Driving style/history]<br>Past toll pass average vehicle speed = 50 kph<br>[Lane departure prevention system]<br>Maintain the current lane | Highway driving<br>To go through the tollgate, decrease current speed to 50 kph | APS = 0, BPS = Middle |

Although the above exemplary embodiments have been described as predicting the future requested torque through near-future prediction, it will be apparent to those skilled in the art that the future requested torque may be replaced by other types of parameters or information, e.g. a future acceleration predictive value that is predicted by the acceleration/deceleration prediction unit. In particular, the predicted torque and the predicted braking torque in FIGS. 8 and 9 may correspond to positive (+) acceleration and negative (−) acceleration, respectively.

As is apparent from the above description, a hybrid vehicle associated with at least one exemplary embodiment of the present invention constructed as described above is capable of controlling a charge mode more efficiently. In particular, it may be possible to determine whether to release a lock-up charge mode based on a near-future requested torque predicted using a machine-learning method, thereby improving efficiency.

The above-described present invention may be implemented by a computer-readable code in a computer-readable recording medium. The non-transitory computer-readable recording medium includes all kinds of recording devices in which data readable by a computer system is stored. Examples of the computer-readable recording medium include a hard disk drive (HDD), a solid state disk (SSD), a silicon disk drive (SDD), a ROM, a RAM, a CD-ROM, a magnetic tape, a floppy disk, an optical data storage device, and so on.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of controlling a charge mode for a hybrid vehicle, comprising:
    determining, by a controller, a first torque, wherein the first torque is a currently requested torque;
    determining, by the controller, a second torque or a predicted acceleration, wherein the second torque is a predicted requested torque that is predicted to be generated in a near future from a present time; and
    releasing, by the controller, a lock-up charge mode when the first torque is less than a first threshold value relevant to a reference for determining coasting driving and the second torque or the predicted acceleration is less than a second threshold value relevant to a driving mode change reference.

2. The method according to claim 1, further comprising: maintaining, by the controller, the lock-up charge mode when the first torque is less than the first threshold value and the second torque or the predicted acceleration is greater than the second threshold value.

3. The method according to claim 1, wherein the determining the first torque includes:
    determining, by the controller, positions of an accelerator pedal and a brake pedal; and
    determining, by the controller, the first torque using the determined positions.

4. The method according to claim 1, wherein the determining of the second torque or the predicted acceleration includes:
    determining, by the controller, a driver acceleration/deceleration intention predictive value using an acceleration/deceleration prediction model utilizing at least one of tendency information of a driver, advanced driver assistance system (ADAS) information, navigation information, or vehicle speed information as input values thereof; and
    determining, by the controller, the second torque or the predicted acceleration using the acceleration/deceleration intention predictive value.

5. The method according to claim 4, wherein the acceleration/deceleration prediction model is continually modified through a machine-learning-based learning method.

6. The method according to claim 4, wherein the acceleration/deceleration intention predictive value includes information regarding positions of an accelerator pedal and a brake pedal in the near future.

7. The method according to claim 1, wherein the first threshold value corresponds to a torque during an accelerator pedal position sensor off mode, and the second threshold value corresponds to a reference torque for converting a first driving mode using an electric motor into a second driving mode using both the electric motor and an engine.

8. The method according to claim 7, wherein the first driving mode includes an electric vehicle (EV) mode, and the second driving mode includes a hybrid electric vehicle (HEV) mode.

9. The method according to claim 1, wherein the lock-up charge mode includes a mode in which, when an engine clutch disposed between an electric motor and an engine is in an engaged state, the electric motor performs a charging operation using driving force of the engine and coasting energy of the hybrid vehicle.

10. A non-transitory computer-readable recording medium for recording a program for performing the method of controlling a charge mode for a hybrid vehicle according to claim 1.

11. A hybrid vehicle, comprising:
a driving information detection unit configured to detect driving information related to traveling of the hybrid vehicle using a plurality of sensors of the hybrid vehicle;
a driver acceleration/deceleration prediction unit configured to generate a driver near-future acceleration/deceleration intention predictive value, to which traveling conditions of the hybrid vehicle are reflected, using information transmitted from the driving information detection unit utilizing an acceleration/deceleration prediction model; and
a hybrid controller configured to determine a first torque using information transmitted from the driving information detection unit, the first torque being a currently requested torque, and determine a second torque or predicted acceleration using the near-future acceleration/deceleration intention predictive value, wherein the second torque is a predicted requested torque that is predicted to be generated in a near future from a present time,
wherein the hybrid controller is configured to release a lock-up charge mode when the first torque is less than a first threshold value relevant to a reference for determining coasting driving and the second torque or the predicted acceleration is less than a second threshold value relevant to a driving mode change reference.

12. The hybrid vehicle according to claim 11, wherein the hybrid controller is configured to maintain the lock-up charge mode when the first torque is less than the first threshold value but the second torque or the predicted acceleration is greater than the second threshold value.

13. The hybrid vehicle according to claim 11, wherein the hybrid controller is configured to determine the first torque using positions of an accelerator pedal and a brake pedal.

14. The hybrid vehicle according to claim 11, wherein the hybrid controller is configured to determine a driver acceleration/deceleration intention predictive value using an acceleration/deceleration prediction model utilizing at least one of tendency information of a driver, advanced driver assistance system (ADAS) information, navigation information, or vehicle speed information as input values thereof, and determine the second torque or the predicted acceleration using the acceleration/deceleration intention predictive value.

15. The hybrid vehicle according to claim 14, wherein the acceleration/deceleration prediction model is continually modified through a machine-learning-based learning method.

16. The hybrid vehicle according to claim 14, wherein the acceleration/deceleration intention predictive value includes information regarding positions of an accelerator pedal and a brake pedal in the near future.

17. The hybrid vehicle according to claim 11, wherein the first threshold value corresponds to a torque during an accelerator pedal position sensor off mode, and the second threshold value corresponds to a reference torque for converting a first driving mode using an electric motor into a second driving mode using both the electric motor and an engine.

18. The hybrid vehicle according to claim 17, wherein the first driving mode includes an electric vehicle (EV) mode, and the second driving mode includes a hybrid electric vehicle (HEV) mode.

19. The hybrid vehicle according to claim 11, wherein the lock-up charge mode includes a mode in which, when an engine clutch disposed between an electric motor and an engine is in an engaged state, the electric motor performs a charging operation using driving force of the engine and coasting energy of the hybrid vehicle.

20. A hybrid vehicle, comprising:
a driving information detection unit configured to detect driving information related to traveling of the hybrid vehicle using a plurality of sensors of the hybrid vehicle;
a driver acceleration/deceleration prediction unit configured to generate a driver near-future acceleration/deceleration intention predictive value, to which traveling conditions of the hybrid vehicle are reflected, using information transmitted from the driving information detection unit utilizing an acceleration/deceleration prediction model; and
a hybrid controller configured to determine a third torque using information transmitted from the driving information detection unit, the third torque being a current braking torque, and determine a fourth torque or predicted acceleration using the near-future acceleration/deceleration intention predictive value, the fourth torque being a predicted braking torque that is predicted to be generated in a near future from a present time,
wherein when a lock-up charge mode is activated, the hybrid controller is configured to release the lock-up charge mode when the third torque is greater than a third threshold value relevant to a reference for releasing the lock-up charge mode and the fourth torque or the predicted acceleration is greater than a fourth threshold value relevant to a reference for ensuring drivability.

* * * * *